United States Patent

Seidl et al.

[11] Patent Number: 6,082,924
[45] Date of Patent: Jul. 4, 2000

[54] CLAMPING JOINT BETWEEN A SPINDLE HEAD AND A ROLL STUB

[75] Inventors: Karl-Heinz Seidl, Hilchenbach; Hans-Joachim Marburger, Erndtebrück, both of Germany

[73] Assignee: SMS Schloemann-Siemag AG, Dusseldorf, Germany

[21] Appl. No.: 09/042,137

[22] Filed: Mar. 13, 1998

[30] Foreign Application Priority Data

Mar. 14, 1997 [DE] Germany .............................. 197 10 554

[51] Int. Cl.[7] ...................................................... B25G 3/02
[52] U.S. Cl. ............................ 403/365; 403/368; 403/327
[58] Field of Search ................................... 403/388, 368, 403/367, 366, 365, 327, 369, 356

[56] References Cited

U.S. PATENT DOCUMENTS

| 3,222,884 | 12/1965 | Lyle | 403/358 |
| 3,327,497 | 6/1967 | Amend et al. | 403/369 |
| 3,404,907 | 10/1968 | Kane et al. | 403/358 |
| 3,702,200 | 11/1972 | Carman . | |
| 4,064,708 | 12/1977 | Breads | 403/369 |
| 4,702,635 | 10/1987 | Mullenberg | 403/368 |

FOREIGN PATENT DOCUMENTS 31 39 625 A1  4/1983  Germany .

*Primary Examiner*—Lynne H. Browne
*Assistant Examiner*—Kenneth Thompson
*Attorney, Agent, or Firm*—Herbert Dubno

[57] ABSTRACT

A clamping joint between a universal joint spindle and a stub or wobbler of a rolling mill roll is formed by providing wedge members between the juxtaposed surfaces of the coupling box and roll stub and by bracing the wedge members by springs in the coupling head bracing the wedge members against a shoulder of the roll stub.

9 Claims, 3 Drawing Sheets

CLAMPING JOINT BETWEEN A SPINDLE HEAD AND A ROLL STUB

FIELD OF THE INVENTION

Our present invention relates to a clamping joint between a spindle head of a flexible-coupling spindle capable of driving a roll-mill roll and the wobbler or roll stub thereof.

BACKGROUND OF THE INVENTION

It is common practice for a rolling mill roll to comprise a roll body, a pair of necks at opposite axial ends to support that roll upon bearings of the mill stand and at one axial end, a roll stub or wobbler which is not of fully circular cross section and which can be engaged in a coupling box or sleeve of the head of a flexible coupling head spindle, for the driving of the roll, i.e. the transmission of torque between the coupling box and the roll stub.

The term "flexible coupling" as here used, is intended to refer primarily to couplings which include a shaft having so called "universal" joints at opposite ends and which are connected between the drive motor and the wobbler or stub of the roll for driving same.

A typical flexible coupling spindle is the universal joint type of spindle which has Hooke's joints or Hooke's couplings at opposite ends thereof. It is also possible to provide another type of universal coupling, for example, a toothed coupling of the type in which an externally toothed gear type member engages in an internally toothed gear type member but these members are so shaped that they need not be perfectly aligned axially to transfer torque therebetween.

The spindle head and the roll stub have mutually fitting surfaces when the roll stub is received in the coupling box, capable of transmitting torque therebetween and wear plates may be inserted between such surfaces with certain tolerances, for example, an interference fit or a sliding clearance to permit torque transmission. The latter case is preferred to facilitate mounting of the parts which must fit together.

Thus, while a certain play is frequently desirable to permit mounting of the assembly and connection of the roll stub with the coupling box or a similar sleeve, the system has the drawback that the wear plates are subjected to rapid wear and there are sudden jumps in the load applied to the system and hence in the operation of the mill which can detrimentally effect the quality of the products produced.

OBJECTS OF THE INVENTION

It is, therefore, the principal object of the present invention to provide an improved clamping joint between a coupling box and sleeve at the head of a flexible coupling spindle and the roll stub or wobbler which can reduce the wear and improve rolling quality.

Another object of the invention is to provide an improved construction of the releasable connection between the spindle head of a toothed-joint or Hooke's-joint spindle and the roll stub or wobbler of a rolling mill roll so that play is available for mounting but, once the mounting operation is completed, a totally play-free form-fitting connection of the parts is achieved.

SUMMARY OF THE INVENTION

These objects and others which will become more readily apparent hereinafter are attained, in accordance with the invention by providing between the torque-transmitting surfaces of the coupling box or sleeve at the head of the gear-type or Hooke's-joint spindle and the roll stub or wobbler, wedge-shaped plates which are spring loaded and thus completely take up the play between such surfaces once the mounting is complete.

According to a feature of the invention, the clamping joint between a coupling box of a universal drive spindle and a roll stub of the rolling mill are formed with juxtaposed torque-transmitting surfaces defining a wedge-shaped gap between them, the clamping joint comprising at least one spring-loaded wedge plate fitted into the gap and forming a play-free shape-locking connection between the coupling box and said roll stub.

While a single wedge-shaped gap can be provided, it has been found to be advantageous to provide at least two and even advantageously three or more such wedge-shaped gaps, with respective wedge-shaped plates received therein and spring biased in the manner described.

In the latter case the wedge-shaped gaps and wedge plates will be angularly equispaced between the coupling axis.

With this construction, a clamping of the cooperating coupling members of the roll and spindle can be effected by itself and spring-loaded wedge plates can be radially shifted so that they clamp in place automatically when the roll stub is inserted into the coupling box. Torque transmission is effected in a shape-locking manner, but in a play-free state.

According to a feature of the invention, the wedge-plate or wedge-plates can be braced against a shoulder of the roll stub at one end and at the end turned toward the spindle can be engaged by compression springs. An advantage of this arrangement of springs is that, for removal of the coupling box from the wobbler, the springs will press the wedge plates axially in a direction assisting in release. Upon forming the construction, i.e. upon insertion of the roll stub in the coupling box, the shoulder presses the wedge plates against the force of these springs to drive the wedge tightly in the wedging direction and thereby form the play-free connection.

It has been found to be advantageous to form the gap between a conical groove of one and/or the other of the interconnected members and, in addition, to brace the coupling box axially by a plate against which a spring loaded pin can bear. The flexible coupling can be any universal joint spindle which is commonly used, with Hooke's joints at the opposite ends or with gear-type joints at the opposite ends.

In an antipodal position with respect to the or each wedge-plate, a wear plate can be interposed between the wall of the bore of the coupling box or sleeve and the roll stub or wobbler. To assist in holding the wedge plates or wear plates during assembly, the plates can be engaged by screws which, especially in the case of the wedge plates, pass through axially elongated slots or elongated passages in the coupling box. These slots may be covered by a further plate outwardly of the roll stub.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
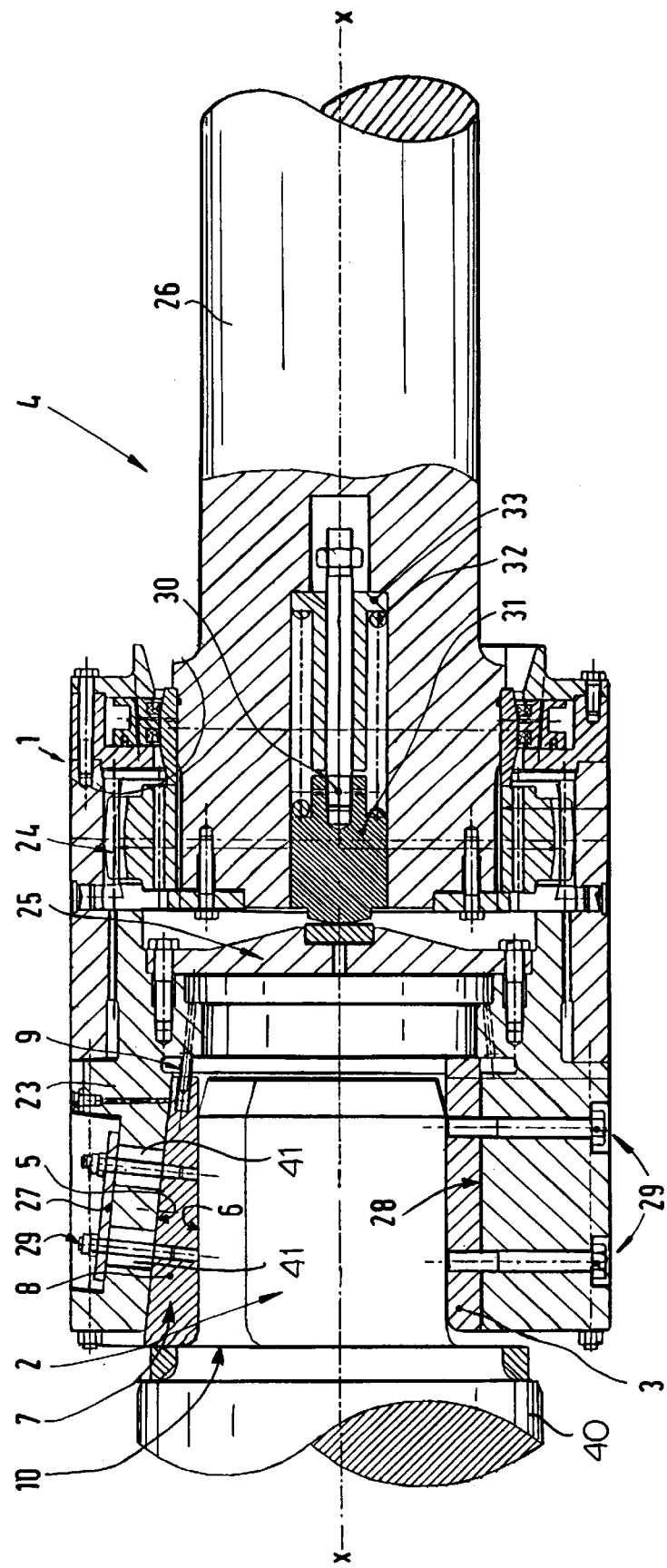
FIG. 1 is an axial section through a clamping joint between a spindle head of a gear-type flexible coupling and the roll stub or wobbler.

The clamping joint shown in FIG. 1 serves to connect a spindle head 2 of a gear-type universal joint spindle 4 with a roll stub or wobbler 2 of a roll whose neck has been shown at 40 in FIG. 1.

The coupling box 23 of the head 1 had surfaces 5 which are juxtaposed with the surfaces 6 and are referred to herein as the fitting surfaces, i.e. the surfaces which transmit torque between the roll and the spindle. To effect a play-free form-fitting interconnection between the coupling box 23 and the roll stub 2, the gap between the surfaces 5 and 6 is wedge-shaped, i.e. diverges toward the roll body. Within this wedge-shaped gap 7 a spring-loaded wedge plate 8 is received.

Figure 3:
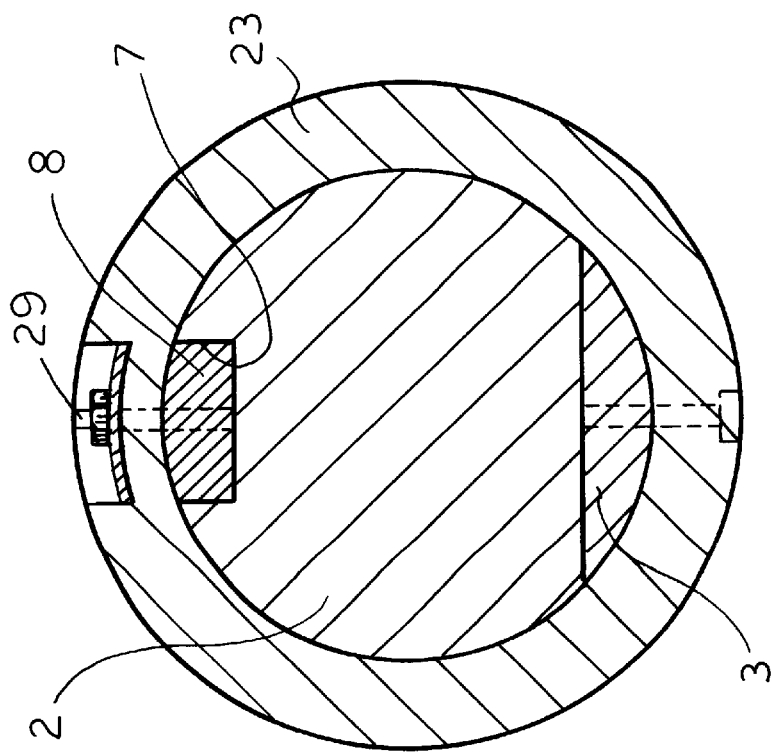
FIG. 3 is a transverse cross sectional view through a joint of these types.

At its free end turned toward the spindle, the wedge plate 8 is engaged by at least one compression spring 9 which is effective to urge the wedge plate axially to the left. At its opposite side, the wedge plate is engaged by a holder 10 of the roll stub 2. The coupling box 23 has at least one internal recess with its surface 5 conically widening toward the roll stub for receiving this wedge plate. Preferably the wedge plate 8 is formed as a key received in keying grooves of the roll stub 2 and the coupling box 23 in gap 7. While FIGS. 1 and 3 show only a single wedge plate, it will be understood that at least two and usually three or more such wedge plates can be provided in respective gaps in advantageously equispaced relationship.

Advantageously, the coupling box 23 is axially shiftable with respect to the toothed joint and comprises a central pressure plate 25 against which the head of a pin 23 is urged by a compression spring 32 surrounding a guide pin 30 in a guide sleeve 33. The coupling box is thus shiftable to the left by the spring force while the wedge 8 is braced against a shoulder 10 to join the parts of the coupling together. As a consequence, when the spindle head is to be connected to the roll stub or wobbler, the coupling box is simply pressed over the roll stub with the spring 32 allowing axial movement of the coupling box 23 to the left until the edge 8, held by the shoulder 10, jams in the coupling box.

FIG. 1 also shows, antipodally to the wedge-plate 8 with respect to the X-axis of rotation, a wear plate 3 between the bore 28 of the coupling box 23 and the roll stub. As can be seen from FIGS. 1 and 3 the surfaces of the wear plate 3 in contact with the roll stub 2 and the wall of bore 28 are parallel to one another. Here again a plurality of such wear plates can be provided in angularly equispaced relationship. The wear plates are also locked against play by the wedge again previously described so that rapid wear by them is prevented. To facilitate assembly, the wedge plates and the wear plates are held by bolts 29 on the coupling box. The bolts 29 of the wedge plates are guided in slots 41 covered by a spacer plate 27 allowing the axial movement of the wedge relative to the coupling box. It will be apparent that the connection between the spindle head of the transversal joint spindle 42 and its spindle shaft 26 with the roll is compact and easily mounted.

Figure 4:
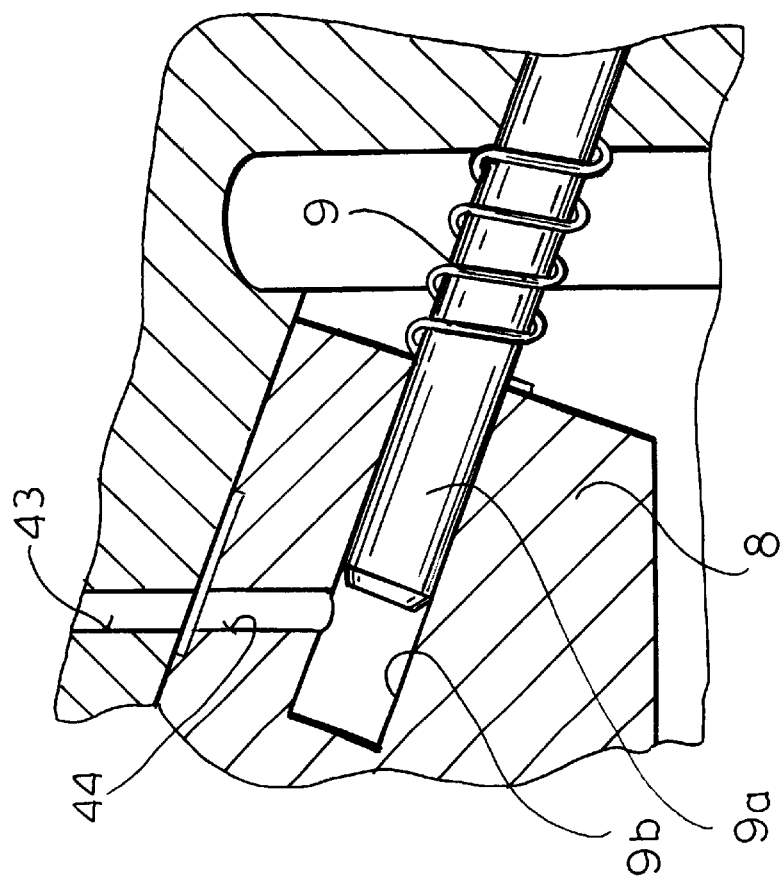
FIG. 4 is a detail view showing the bracing of a compression spring against the edge of a wedge plate turned toward the spindle.

As can be seen from FIG. 4, the compression spring 9 can surround a pin 9a slidable in a bore 9b of the wedge plate 8.

A lubricant bore 43 in the coupling box can communicate with a lubricant passage 44 of the wedge plate to deliver lubricant to the bore 49.

Figure 2:
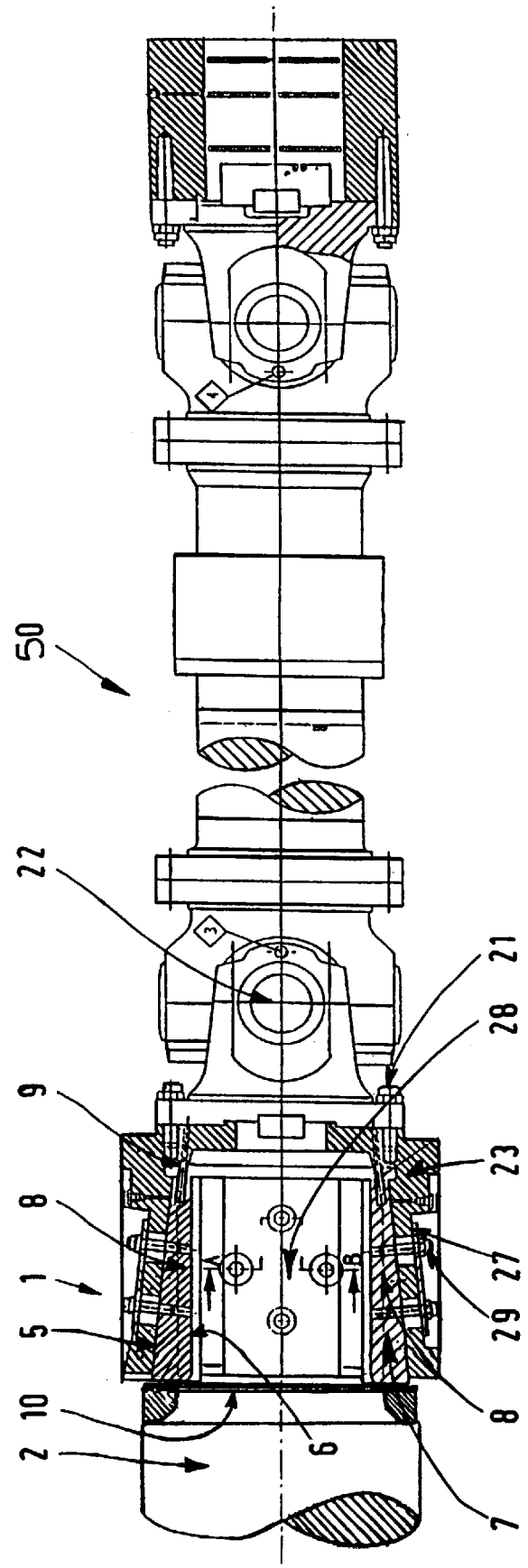
FIG. 2 is a view similar to FIG. 1 showing the connection of a spindle head of a Hookes joint spindle and the roll stub.

A largely similar construction is shown for the Hooke's joint spindle 50 as illustrated in FIG. 2. The Hooke's joint 22 has a coupling box 23 which is affixed to the Hooke's joint by screws 21. The spindle 50 otherwise has a head which receives the roll stub 2 in the manner which has previously been described, with the wedge plates 8 being biased by springs 9 and being engaged by the shoulder 10 as has been described. The screws 29 can be tightened once the coupling is assembled. The bore of the coupling box 23 has been represented at 28.

We claim:

1. A clamping joint between a coupling box of a flexible-coupling drive spindle and a roll stub of a rolling mill roll wherein said roll stub fits into and is received in said coupling box and said roll stub and coupling box are formed with juxtaposed torque-transmitting surfaces defining a wedge-shaped gap between them on one side of an axis of the roll stub and coupling box, said clamping joint comprising a spring-loaded wedge plate fitted into said gap and forming a play-free shape-locking connection between said coupling box and said roll stub, and a wear plate received between a wall of a bore formed in said coupling box and said roll stub radially opposite said wedge plate with respect to said axis said wear plate having parallel surfaces in contact with said roll stub and said wall.

2. The clamping joint defined in claim 1 wherein said wedge plate is braced at a free end facing in the direction of said spindle against at least one compression spring effective to bear upon said wedge plate in an axial direction, and at an opposite side of said wedge plate, against a shoulder of said roll stub.

3. The clamping joint defined in claim 1 wherein said coupling box comprises at least one internal recess having a generally conical torque transmitting surface widening axially outwardly and receiving said wedge plate.

4. The clamping joint defined in claim 1 wherein said wedge plate is received in a wedge groove forming said gap and defined between said roll stub and said coupling box.

5. The clamping joint defined in claim 1 wherein said clamping box is axially displaceable relative to a toothed universal joint of the flexible coupling drive spindle and is provided with a central pressure plate, said clamping joint further comprising means for applying an axial spring force centrally of said spindle to said pressure plate.

6. The clamping joint defined in claim 5 wherein said means includes the head of a pin bearing upon said pressure plate and a spring for displacing said pin.

7. The clamping joint defined in claim 1 wherein said coupling box is provided with longitudinal slots covered by a cover plate and through which positioning screws pass to retain said wedge plate on said coupling box.

8. The clamping joint defined in claim 1 wherein said drive spindle has at least Hooke's joint and wherein said coupling box and said roll stub have such torque transmitting surfaces angularly equispaced apart and receiving respective wedge plates between them.

9. The clamping joint defined in claim 8 wherein said torque transmitting surfaces defining each such gap are formed as grooves keying said roll stub and said coupling box together for joint rotation.

* * * * *